(12) United States Patent
Onodera

(10) Patent No.: US 8,784,014 B2
(45) Date of Patent: Jul. 22, 2014

(54) CUTTING INSERT, CUTTING TOOL, AND METHOD OF MANUFACTURING MACHINED PRODUCT USING THE SAME

(75) Inventor: Chie Onodera, Yasu (JP)

(73) Assignee: Kyocera Corporation, Kyoto (JP)

( * ) Notice: Subject to any disclaimer, the term of this patent is extended or adjusted under 35 U.S.C. 154(b) by 108 days.

(21) Appl. No.: 13/504,606

(22) PCT Filed: Oct. 28, 2010

(86) PCT No.: PCT/JP2010/069132
§ 371 (c)(1),
(2), (4) Date: Apr. 27, 2012

(87) PCT Pub. No.: WO2011/052667
PCT Pub. Date: May 5, 2011

(65) Prior Publication Data
US 2012/0210834 A1  Aug. 23, 2012

(30) Foreign Application Priority Data

Oct. 29, 2009 (JP) .................. 2009-249106
Nov. 28, 2009 (JP) .................. 2009-270862

(51) Int. Cl.
*B23B 27/16* (2006.01)
*B23B 27/04* (2006.01)

(52) U.S. Cl.
USPC .......................................... 407/114; 407/115

(58) Field of Classification Search
USPC .......... 407/108, 110, 113, 114, 115, 116, 117
See application file for complete search history.

(56) References Cited

U.S. PATENT DOCUMENTS

| 4,181,456 | A | * | 1/1980 | Oaks ................................ 407/38 |
| 4,195,956 | A | * | 4/1980 | Mihic ............................ 407/108 |
| 4,583,887 | A | * | 4/1986 | Wertheimer ................... 407/116 |
| 5,035,545 | A | * | 7/1991 | Zinner ........................... 407/110 |
| 5,704,737 | A |   | 1/1998 | Alford |
| 5,993,118 | A | * | 11/1999 | Brask et al. ................... 407/110 |
| 7,883,300 | B1 | * | 2/2011 | Simpson et al. .............. 407/115 |

(Continued)

FOREIGN PATENT DOCUMENTS

| CN | 1053902 | 8/1991 |
| CN | 1867416 | 11/2006 |

(Continued)

OTHER PUBLICATIONS

Japanese Office Action, Japanese Patent Application No. 2011-538469, and Statement of Relevance of Non-English References, Aug. 20, 2013, 4 pages.

*Primary Examiner* — Will Fridie, Jr.
(74) *Attorney, Agent, or Firm* — Volpe and Koenig, P.C.

(57) ABSTRACT

A cutting insert according to an embodiment of the present invention includes an upper surface; a side surface; and a cutting edge located at an intersection region of the upper surface and the side surface. The upper surface includes a rake surface continuous with the cutting edge; and a rising surface inclined and lying at a higher position as going inward from the rake surface. The rake surface includes a pair of first raised parts respectively extending inward from near both ends of the cutting edge in a top view; and a second raised part extending from one of the pair of first raised parts to the other. A cutting tool including the cutting insert, and a method of manufacturing a machined product by using the cutting tool are also provided.

22 Claims, 12 Drawing Sheets

(56) References Cited

U.S. PATENT DOCUMENTS

| | | | |
|---|---|---|---|
| 8,402,867 B2* | 3/2013 | Harif | 82/1.11 |
| 2003/0156909 A1 | 8/2003 | Tong | |
| 2005/0123367 A1* | 6/2005 | Gati | 407/113 |
| 2006/0269367 A1 | 11/2006 | Havrda | |
| 2010/0119314 A1* | 5/2010 | Nagaya et al. | 407/113 |
| 2013/0170917 A1* | 7/2013 | Hecht | 407/110 |

FOREIGN PATENT DOCUMENTS

| | | |
|---|---|---|
| JP | 06-008013 | 1/1994 |
| JP | 11-503674 | 3/1999 |
| JP | 2005-288613 | 10/2005 |
| JP | 2008272923 A | 11/2008 |
| WO | WO 96-33037 | 10/1996 |

\* cited by examiner (a)

(b)

(a)

(b)

(a)

(b)

A

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

A cutting insert for grooving process or the like (hereinafter referred to as an "insert" in some cases) requires various functions, such as smooth discharge of generated chips, besides formation of a machined groove and width enlargement of the machined groove. In order to improve chip discharge performance, various considerations in the shape of a rake face of the insert have conventionally been made (for example, refer to Japanese Unexamined Patent Publication No. 6-8013).

However, in the insert described in Japanese Unexamined Patent Publication No. 6-8013, a plateau part 33 and a shoulder part 17, which are located at a higher position, exist behind a chip deflection surface 32. Therefore, there is a probability that chips generated from a workpiece having rich ductility cannot be smoothly discharged backward (outward).

Hence there is a desire for the insert allowing for excellent chip discharge property even when the workpiece is a material having rich ductility.

SUMMARY OF THE INVENTION

An object of the present invention is to provide a cutting insert and a cutting tool, which have excellent chip discharge performance, and a method of manufacturing a machined product using the cutting tool.

A cutting insert according to one embodiment of the present invention includes an upper surface, a side surface, and a cutting edge located at an intersection region of the upper surface and the side surface. The upper surface includes a rake surface continuous with the cutting edge; and a rising surface inclined and lying at a higher position as going inward from the rake surface. The rake surface includes a pair of first raised parts respectively extending inward from near both ends of the cutting edge in a top view, and a second raised part extending from one of the pair of first, raised parts to the other.

In a cutting insert according to the other embodiment of the present invention 1, the cutting edge includes a first cutting edge and a second cutting edge intersecting each other. At least one of the pair of first raised parts includes an approach portion that extends along the second cutting edge and approaches the second cutting edge as it separates from the first cutting edge.

A cutting tool according to an embodiment of the present invention includes the cutting insert and a holder configured to attach the cutting insert to a front end thereof.

A method of manufacturing a machined product according to an embodiment of the present invention includes rotating a workpiece; bringing the workpiece being rotated and the cutting edge of the cutting tool into contact with each other; and allowing the workpiece and the cutting tool to be separated from each other.

In the cutting insert according to the one embodiment of the present invention, the rake surface of the upper surface further includes the second raised part extending from one of the pair of first raised parts to the other, in addition to the pair of first raised parts extending inward from near the both ends of the cutting edge. Therefore, generated chips can be discharged in the following process. Firstly, chips generated by the cutting edge are curled like a spring between the cutting edge and the second raised part by contact with the second raised part. As soon as a curling diameter of the chips is increased as the grooving process proceeds, the chips climb over the ridge portion of the second raised part and are drawn onto the rising surface. This provides a large contact area between the chips and the rising surface, and also increases wear resistance, thereby making it easier for the chips to be divided by an appropriate length. Hence, even when the workpiece is the material having, for example, rich ductility, excellent chip discharge performance is attainable.

In the cutting insert according to the other embodiment of the present invention, at least one of the pair of first raised parts includes the approach portion that approaches the second cutting edge as it separates from the first cutting edge. Therefore, during the traversing process for enlarging the width of a machined groove, the chips generated by the side cutting edge are divided by the first raised part, and are satisfactorily discharged to the outside of the machined groove along the approach portion of the first raised part. This reduces the chips remaining in the machined groove of the workpiece, thereby reducing damage to the workpiece and the cutting insert due to the chips.

PREFERRED EMBODIMENTS FOR CARRYING OUT THE INVENTION

<Cutting Insert>
First Embodiment

The cutting insert according to the first embodiment of present invention is described in detail below with reference to FIGS. 1 to 5.

Figure 1:
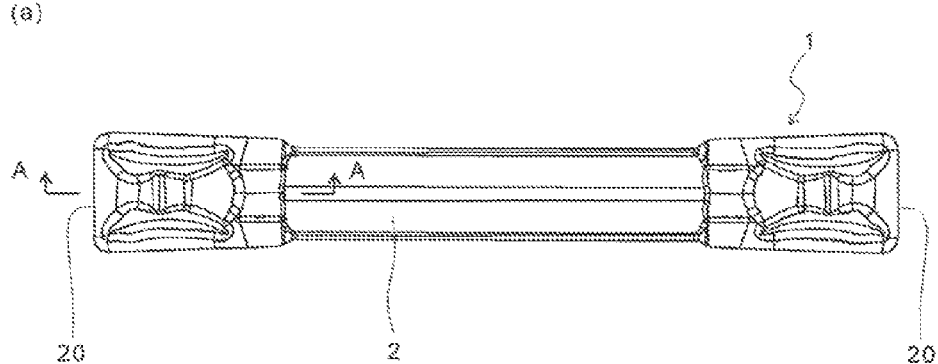
FIG. 1(a) is a plan view showing a cutting insert according to a first embodiment of the present invention.
FIG. 1(b) is a side view thereof.
Figure 1:
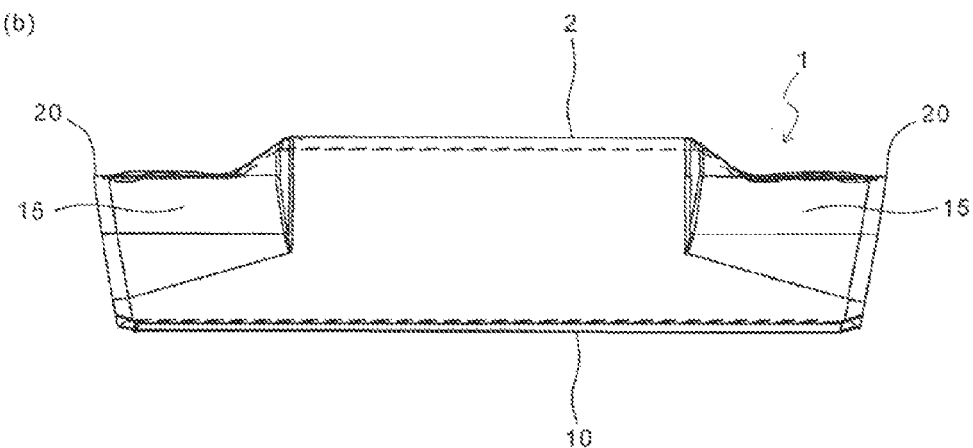

The insert 1 according to the present embodiment is a two-corner type insert with a substantially rectangular column-shaped body as shown in FIG. 1, and is suitably used for cutting-off process, grooving process, or the like, particularly for the grooving process.

The body is a sintered body, such as a cemented carbide, cermet, or ceramics, having a film coated thereon. The film is for improving wear resistance of the body. Examples of the film composition include titanium-based compounds, such as titanium carbide, titanium nitride, and titanium carbonitride; and alumina. The film is required to have at least one layer, or may be made of a plurality of layers. Alternatively, the body may be made of the sintered body not coated with the film.

The body includes an upper surface 2, a portion of which has a function of a so-called rake surface; a lower surface 10, a portion of which has a function as an attachment surface with respect to a holder; a side surface 15 located between the upper surface 2 and the lower surface 10 in which a portion of the side surface has a function as a so-called flank surface; and two cutting edges 20 and 20 which are formed at an intersection region of the upper surface 2 and the side surface 15, and are located at both ends thereof.

Figure 2:
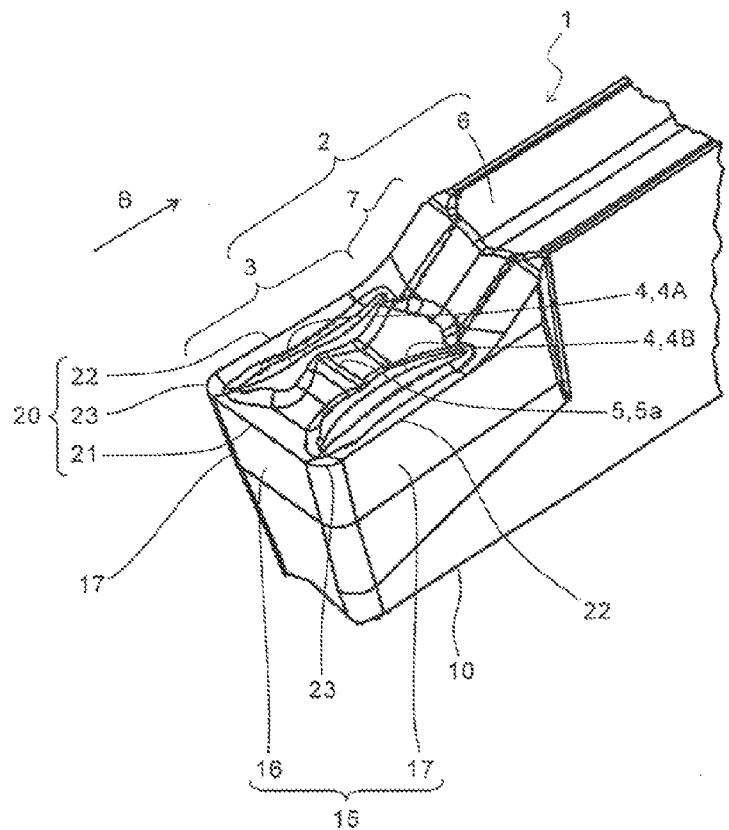
FIG. 2 is a partially enlarged perspective view showing the vicinity of one end of the cutting insert according to the first embodiment of the present invention.

As shown in FIG. 2, the side surface 15 includes a front flank surface 16 which is positioned at the front of the front end thereof, and is positioned so as to intersect the upper surface 2 and the lower surface 10, respectively; and side flank surfaces 17 and 17 respectively positioned on both side surfaces thereof.

The cutting edge 20 includes a front cutting edge 21 formed at an intersection region of the upper surface 2 and the front flank surface 16; and side cutting edges 22 and 22 formed at intersection regions of the upper surface 2 and the side flank surfaces 17 and 17, respectively. In the cutting edge 20, a corner cutting edge 23, which is in a substantially circular arc form in a top view, is formed between the front cutting edge 21 and the side cutting edge 22 adjacent to each other. The front cutting edge 21 and the side cutting edge 22 are continuous with each other with the corner -cutting edge 23 interposed therebetween.

Figure 3:
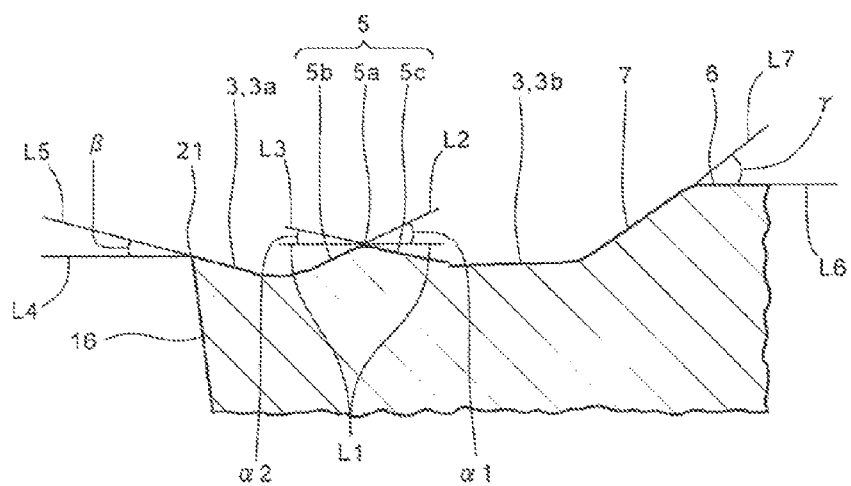
FIG. 3 is a diagram showing an enlarged broken section taken along the line A-A in FIG. 1(a)

The upper surface 2 has a rake surface 3, a rising surface 7 (rising inclined surface), and a clamp surface 6 in order from the front cutting edge 21. The rake surface 3 is the surface along which generated chips graze. The rake surface 3 is continuous with the cutting edge 20. The rake surface 3 includes a rake surface 3a formed continuously with the front cutting edge 21, and a rake surface 3b formed continuously with the rising surface 7, as shown in FIG. 3.

The clamp surface 6 is the surface clamped to a holder 51 described later, together with the lower surface 10. The clamp surface 6 is located more inward and at a higher position compared to the rake surface 3. In the present specification, the term "inward" denotes inward the insert 1 with respect to the front cutting edge 21, that is, toward the chip discharge direction indicated by arrow B in FIG. 2. In the present specification, the term "higher position" denotes locating at a higher position in the thickness direction of the insert 1 than a comparison object. More specifically, when the insert 1 is placed on a horizontal surface by using the lower surface 10 as a seating surface, the clamp surface 6 is located at a higher position with reference to the front cutting edge 21. When it is difficult to place the insert 1 on the horizontal surface by using the lower surface 10 as the seating surface, the clamp surface 6 is required to lie at a higher position than the rake surface 3 with the insert 1 attached to the holder 51.

The rising surface 7 is inclined and lying at a higher position as going from the rake surface 3 to the clamp surface 6. That is, the rising surface 7 is inclined so as to separate from the lower surface 10 as going from the rake surface 3b to the clamp surface 6. The rising surface 7 is continuous with the rake surface 3b and the clamp surface 6, respectively.

Figure 5:
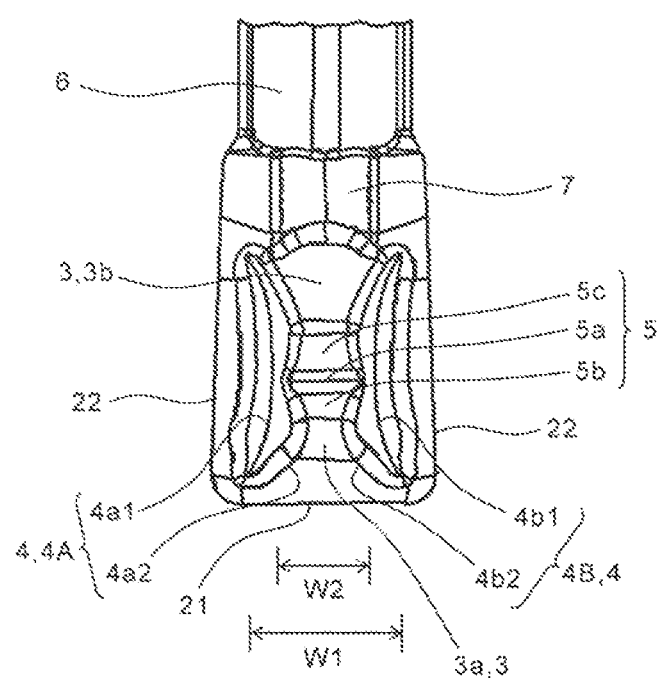
FIG. 5 is a partially enlarged plan view showing the vicinity of one end of the cutting insert according to the first embodiment of the present invention.

The rake surface 3 includes a pair of first raised parts 4 and 4 extending inward from near both ends of the front cutting edge 21, namely, near the corner cutting edges 23 and 23; and a second raised part 5 extending from one of the pair of first raised parts 4 and 4 (the first raised part 4A) to the other (the first raised part 4B) in a top view (refer to FIGS. 2 and 5).

A ridge portion 5a (second top end) of the second raised part 5 is substantially parallel to the front cutting edge 21, and both ends thereof are continuous with the first raised parts 4 and 4 in a top view. That is, the second raised part 5 extends from the first raised part 4A to the first raised part 4B in a direction substantially parallel to the front cutting edge 21. In the present specification, the term "the ridge portion 5a of the second raised part 5" denotes a structure in which the highest portions of the second raised part 5 in individual cross sections perpendicular to the front cutting edge 21 are continuously obtained.

As shown in FIG. 3, the second raised part 5. includes a first inclined surface 5b inclined so as to separate from the lower surface 10 as going from the front cutting edge 21 to the ridge portion 5a of the second raised part 5; and a second inclined surface 5c inclined so as to approach the lower surface 10 as going from the ridge portion 5a to the rake surface 3b. That is, the second raised part 5 includes the first inclined surface 5b inclined at an inclination angle α1 and lying at a higher position as going from the front cutting edge 21 to the ridge portion 5a of the second raised part 5; and a second inclined surface 5c inclined at an inclination angle α2 and lying at a lower position as going from the ridge portion 5a to the rising surface 7. In the present specification, the term "lower position" denotes being located a lower position in the thickness direction of the insert 1 than a comparison object. More specifically, this is prescribed similarly to the foregoing "higher position."

Both end surfaces of the first inclined surface 5b and the second inclined surface 5c are continuous with the first raised parts 4 and 4. In the grooving process with the insert 1 including the rake surface 3 thus configured, generated chips are firstly curled like a spring by the rake surface 3a located between the front cutting edge 21 and the second raised part 5, and the first inclined surface 5b of the second raised part 5. As soon as a curling diameter of the chips is increased as the grooving process proceeds, the chips climb over the ridge portion 5a of the second raised part 5, and are drawn along the second inclined surface 5c of the second raised part 5 onto the rake surface 3b located between the second raised part 5 and the rising surface 7. Consequently, even when the workpiece is the material having, for example, rich ductility, the chips are surely contacted with the rising surface 7, thereby obtaining a large contact area. Accordingly, wear resistance is also increased to allow the chips to be easily divided by an appropriate length.

Further in the present embodiment, the inclination angle α1 of the first inclined surface 5b is larger than the inclination angle α2 of the second inclined surface 5c. That is, the inclination angles α1 and α2 have a relationship of α1>α2. This facilitates discharge of the generated chips in the foregoing chip discharge process. The inclination angle α1 of the first inclination surface 5b is preferably 20-30°, and the inclination angle α2 of the second inclination surface 5c is preferably 5-20°.

In the present specification, the term "inclination angle α1" denotes an angle formed by a line L1 which passes through the ridge portion 5a of the second raised part 5 and is parallel to the lower surface 10, and, a virtual extension line L2 of the first inclined surface 5b in a cross section perpendicular to the front cutting edge 21. Similarly, the term "inclination angle α2" in the present specification denotes an angle formed by the line L1 and a virtual extension line L3 of the second inclined surface 5c.

In the rake surfaces 3a and 3b constituting the rake surface 3, the rake surface 3a is inclined so as to approach the lower surface 10 at a predetermined rake angle β as going from the front cutting edge 21 to the second raised part 5. The rising surface 7 is inclined so as to separate from the lower surface 10 at a predetermined rising angle γ as going from rake surface 3b to the clamp surface 6. These rake angle β and rising angle γ may be respectively adjusted to an optional angle according to the workpiece. Normally, the rake angle β is approximately 10-30°, and the rising angle γ is 20-45°, preferably approximately 20-40°. Particularly, the rising angle γ is preferably larger than the inclination angle α1. This facilitates the discharge of the generated chips in the foregoing chip discharge process.

In the present specification, the term "rake angle β" denotes an angle formed by a line L4 which passes through the front cutting edge 21 and is parallel to the lower surface 10, and a virtual extension line L5 of the rake surface 3a in the cross section perpendicular to the front cutting edge 21. In the present specification, the term "rising angle γ" denotes an angle formed by a line L6 which passes through an intersection region of the rising surface 7 and the clamp surface 6, and is parallel to the lower surface 10, and a virtual extension line L7 of the rising surface 7 in the cross section perpendicular to the front cutting edge 21. The rake surface 3b is substantially parallel to the lower surface 10. Therefore, the rake surface 3 also includes a surface having a rake angle of 0°.

Figure 4:
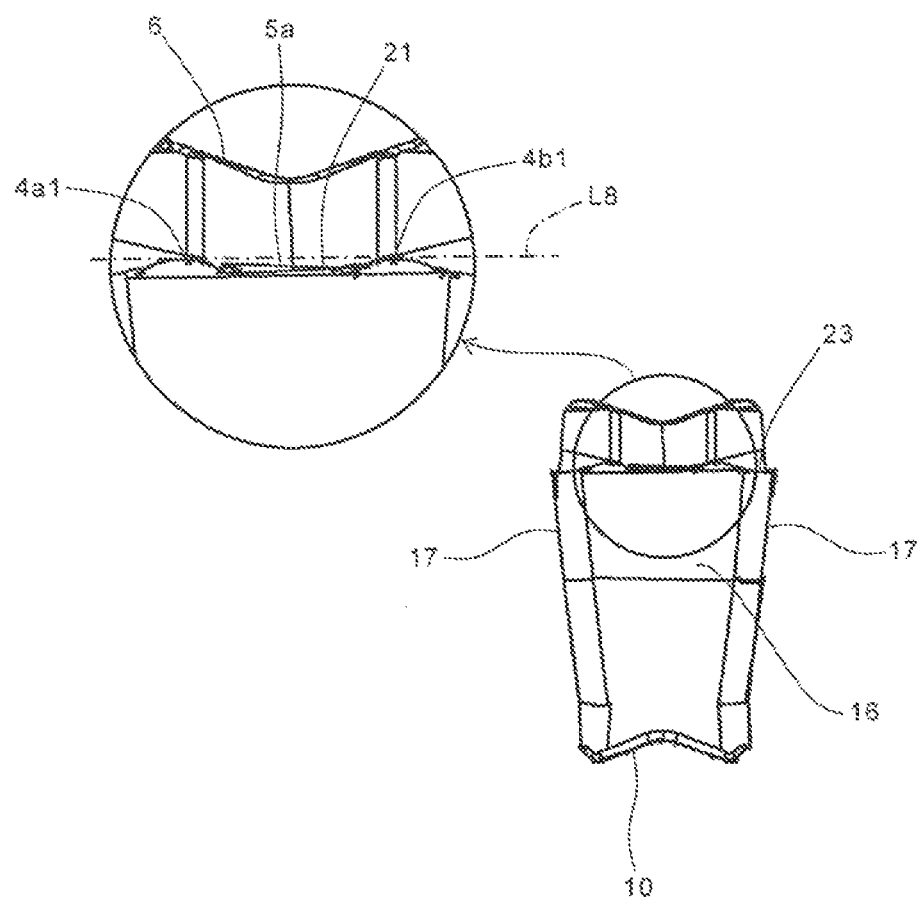
FIG. 4 is an enlarged front view showing the cutting insert according to the first embodiment of the present invention.

On the other hand, as shown in FIG. 4, the ridge portion 5a of the second raised part 5 is located lower than a virtual straight line L8 connecting between ridge portions 4a1 and 4b1 (first top ends) of the pair of first raised parts 4 and 4 in a front view (side view). In the present specification, the term "ridge portions 4a1 and 4b1 of the first raised part 4" denotes a structure in which the highest portions of the first raised part 4 in individual cross sections parallel to the front cutting edge 21 are continuously obtained. Thereby, in the chip discharge process of the grooving process, the chips generated from the front cutting edge 21 are guided to the chip discharge direction by the first raised parts 4 and 4. Even when the chips graze along the second raised part 5, lateral vibration of the chips with respect to the chip discharge direction can be reduced. In the present specification, the term "ridge portions 4a1 and 4b1 of first raised part 4" denote ones obtained by connecting the highest position portions of the first raised part 4 in the cross section parallel to the front cutting edge 21.

The ridge portions 4a1, 4b1, and 5a are respectively located at a higher position than the front cutting edge 21, and are respectively located at a lower position than the clamp surface 6. This allows the cross section of the chips generated by the front cutting edge 21 to be deformed from a flat shape to a warped shape (U-shape) between the rake surface 3a and the first inclined surface 5b. Consequently, the chips are subjected to so-called machining hardening for increasing the hardness of the chips, thereby making it easier for the chips to be divided. The machining hardened chips climb over the ridge portion 5a of the second raised part 5, and are surely drawn onto the rake surface 3b along the second inclined surface 5c. Thereafter, upon contact with the rising surface 7, these chips are divided by the appropriate length and are discharged smoothly.

The pair of first raised parts 4 and 4 are formed along the side cutting edges 22 and 22, as shown in FIG. 5. The second raised part 5 is located at substantially a midportion in the longitudinal direction of the first raised part 4 in a top view. In the pair of first raised parts 4 and 4, both W1 and W2 are smaller a side of the second raised part 5b than a side of the front cutting edge 21, where W1 is a distance between the ridge portion 4a1 of the first raised part 4A and the ridge portion 4b1 of the first raised part 4B; and W2 is a distance between an intersection region 4a2 of the first raised part 4A and a bottom part of the rake surface 3, and an intersection region 4b2 of the first raised part 4B and the bottom part of the rake surface 3.

That is, W1a and W1b have a relationship of W1a<W1b, where W1a is W1 located close to the second raised part 5; and W1b is W1 located close to the front cutting edge 21. Similarly, W2a and W2b have a relationship of W2a<W2b, where W2a is W2 located close to the second raised part 5; and W2b is W2 located close to the front cutting edge 21. Both W1 and W2 decrease as going from the front cutting edge 21 to the second raised part 5.

This allows the cross section of the chips to be deformed from the flat shape to the warped shape between the rake surface 3a and the first inclined surface 5b. Consequently, the chips are subjected to the so-called machining hardening, thereby making it easier for the chips to be divided. The machining hardened chips climb over the ridge portion 5a of the second raised part 5, and are surely drawn onto the rake surface 3b along the second inclined surface 5c. Thereafter, upon contact with the rising surface 7, these chips are divided by the appropriate length and are discharged smoothly.

Both W1 and W2 are larger a side of the rising surface 7 than a side of the second raised part 5. That is, W1a and W1c have a relationship of W1a<W1c, where W1c is W1 located close to the rising surface 7. Similarly, W2a and W2c have a relationship of W2a<W2c, where W2c is W2 located close to the rising surface 7. Both W1 and W2 increase as going from the second raised part 5 to the rising surface 7. This makes it difficult for both ends of the chips to contact with the first raised parts 4 and 4. Consequently, the midportion of the chips is contacted with the rising surface 7, thus allowing for large wear resistance needed for dividing the chips.

In the present specification, "W1" denotes a distance between the ridge portions 4a1 and 4b1 in a direction substantially parallel to the front cutting edge 21 in a top view. Similarly, "W2" denotes a distance between the intersection regions 4a2 and 4b2 in a direction substantially parallel to the front cutting edge 21 in a top view. In the present specification, the term "intersection regions 4a2 and 4b2" denotes the intersection region located close to the second raised part 5 in the intersection regions of the first raised parts 4A and 4B and the bottom part of the rake surface 3.

Second Embodiment

An insert according to a second embodiment of the present invention is described in detail with reference to FIGS. 6 to 10. In FIGS. 6 to 10, the same components as the foregoing FIGS. 1 to 5 are identified by the same reference numerals, and the description thereof is omitted here.

Figure 6:
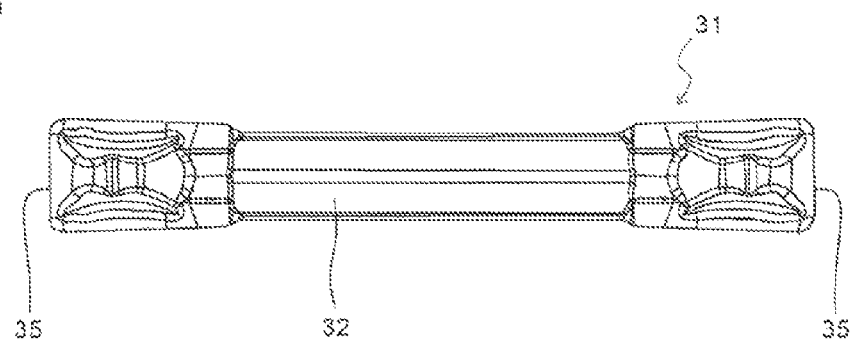
FIG. 6(a) is a plan view showing a cutting insert according to a second embodiment of the present invention.
FIG. 6(b) is a side view thereof.
Figure 6:
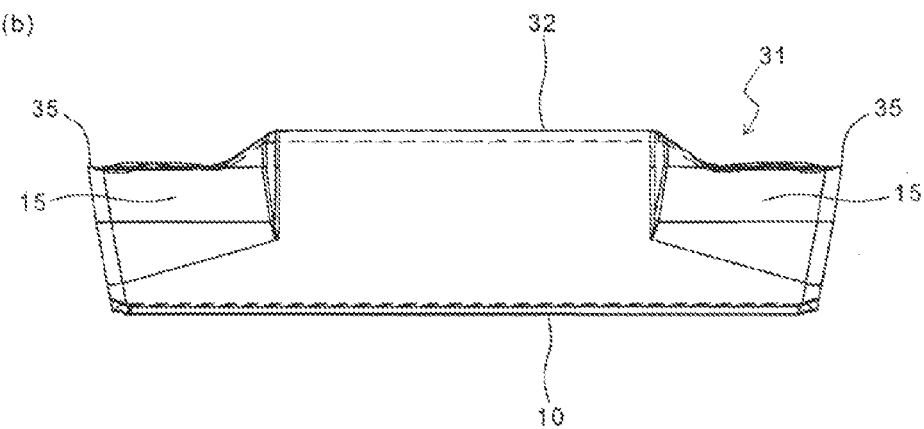

Similarly to the insert 1 of the first embodiment, the insert 31 of the present embodiment is a two-corner type insert with a substantially rectangular column-shaped body as shown in FIG. 6, and is suitably used for cutting-off process, grooving process, or the like, particularly for grooving process.

Figure 7:
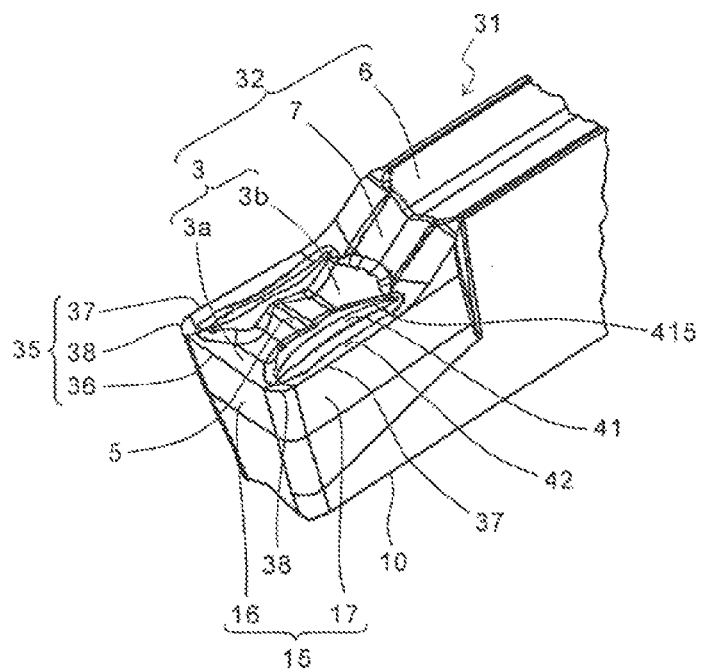
FIG. 7(a) is a partially enlarged perspective view showing the vicinity of one end of the cutting insert according to the second embodiment of the present invention.
FIG. 7(b) is a plan view thereof.
Figure 7:
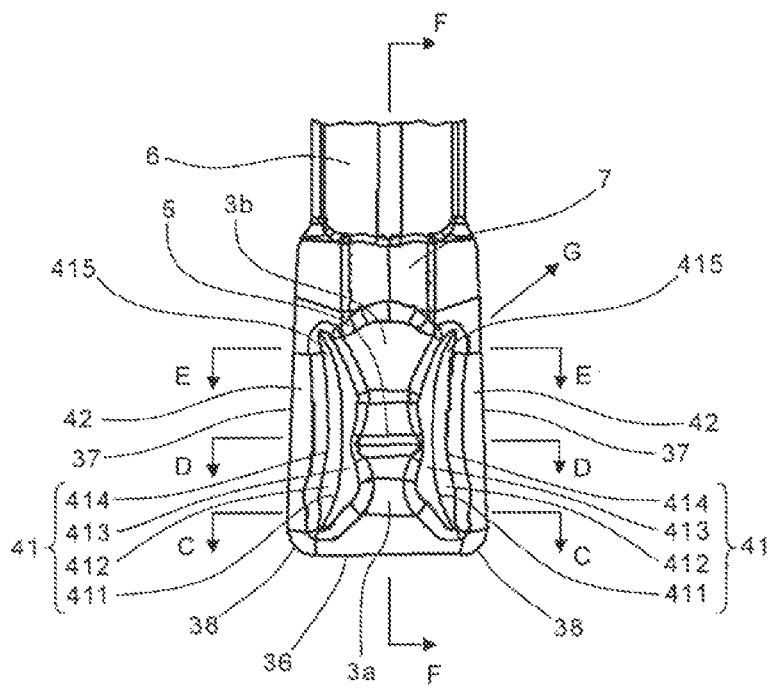
Figure 8:
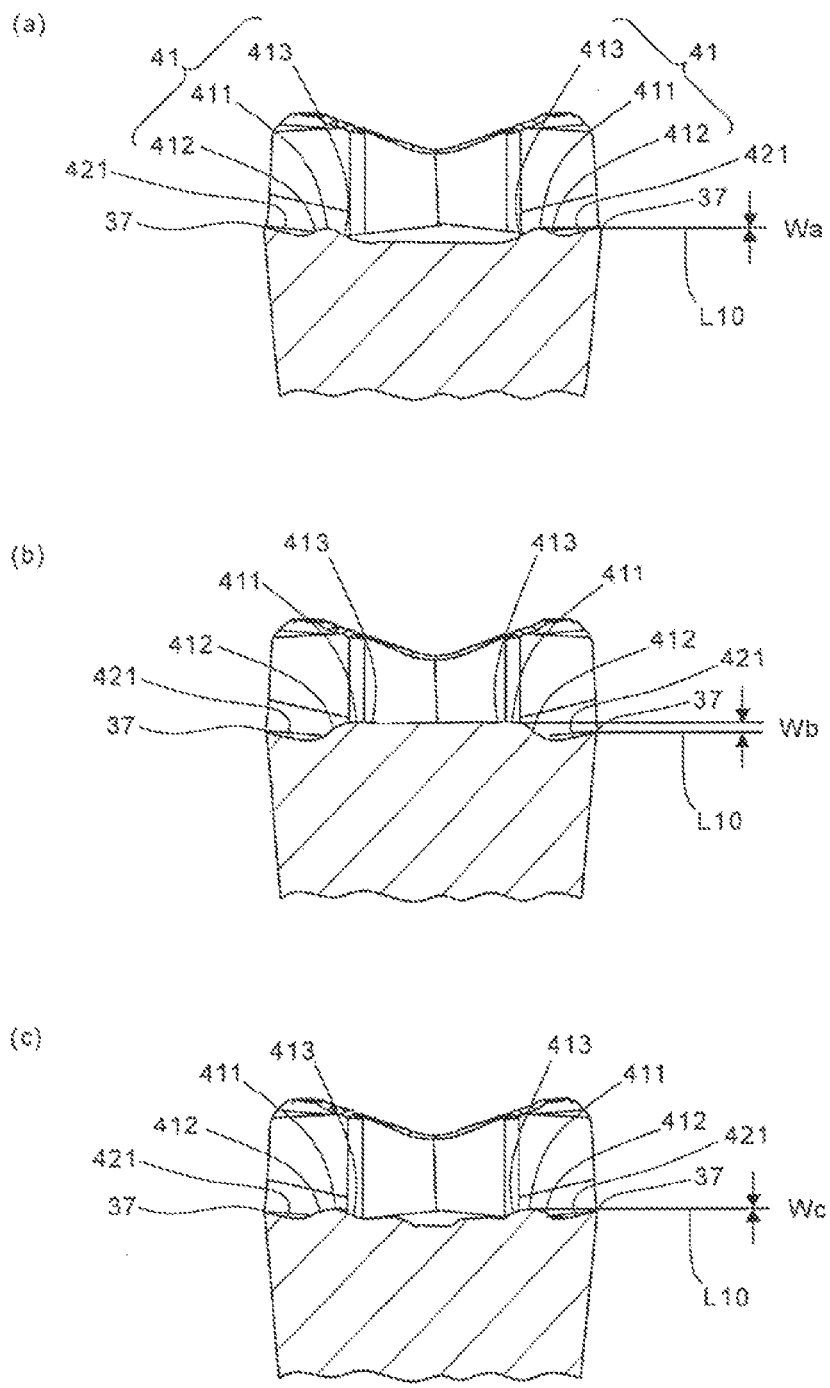
FIG. 8(a) is a diagram showing an enlarged broken section taken along the line C-C in FIG. 7(b)
FIG. 8(b) is a diagram showing an enlarged broken section taken along the line D-D in FIG. 7(b)
FIG. 8(c) is a diagram showing an enlarged broken section taken along the line E-E in FIG. 7(b)

Two cutting edges 35 and 35 are provided at both edge parts of an upper surface 32 included in the body. Specifically, as shown in FIG. 7, each cutting edge 35 includes a front cutting edge 36 (first cutting edge) located close to the front end of the body, and a side cutting edge 37 (second cutting edge) intersecting the front cutting edge 36. That is, the front cutting edge 36 and the side cutting edge 37 are positioned so that virtual extension lines of their respective cutting edges intersect each other.

The front cutting edge 36 is the cutting edge that can be used for groove forming process, namely so-called "grooving process," and corresponds to the front cutting edge 21 of the first embodiment. The side cutting edge 37 is the cutting edge that can be used for the process of enlarging the width of a groove formed by the front cutting edge 36, namely, so-called "traversing process," and corresponds to the side cutting edge 22 of the first embodiment. The side cutting edge 37 can also be used for the process of smoothing a bottom surface of the groove by cross feed, and is therefore usable when the depth of the groove is larger than the length of the side cutting edge 37.

In the present embodiment, a pair of side cutting edges 37 are respectively positioned at both end portions of the front cutting edge 36, and are positioned opposite to each other with the front cutting edge 36 interposed therebetween. A corner cutting edge 38 having a substantially circular arc shape in a top view is formed at an intersection region of the front cutting edge 36 and a virtual extension line of the side cutting edge 37. The front cutting edge 36 and the side cutting edge 37 are continuous with each other with the corner cutting edge 38 interposed therebetween.

A first raised part 41 extending along the side cutting edge 37 is provided on the upper surface 32. In the present embodiment, the first raised part 41 extends from near an end portion of the side cutting edge 37 close to the front cutting edge 36 to near an end portion thereof close to the rising surface 7.

In the present embodiment, a front part of the first raised part 41 located close to the front cutting edge 36 is shaped so as to separate from the side cutting edge 37 as it separates from the front cutting edge 36, and a rear part thereof close to the rising surface 7 is shaped so as to approach the side cutting edge 37 as it separates from the front cutting edge 36 (refer to FIG. 7(b)). Accordingly, a front part of a ridge portion 411 of the first raised part 41 is shaped so as to separate from the side cutting edge 37 as it separates from the front cutting edge 36, and a rear part thereof is shaped so as to approach the side cutting edge 37 as it separates from the front cutting edge 36. That is, the ridge portion 411 of the first raised part 41 approaches the side cutting edge 37 at it separates from the front cutting edge 36. This configuration stabilizes the discharge of chips generated by the side cutting edge 37. Specifically, the chips can be discharged in a direction of arrow G shown in FIG. 7(b). Thus, the chips are discharged along the first raised part 41, thereby making it difficult for the chips to remain in a machined groove. Therefore, the chip discharge performance is improved. In the present specification, a part of the first raised part 41 close to the front end thereof is referred to as a "front part", and a part of the first raised part 41 close to the rear end thereof is referred to as a "rear part."

As shown in FIG. 8(a), the first raised part 41 includes, in a sectional view parallel to the front cutting edge 36, the ridge portion 411; a first inclined portion 412 which is formed close to the side cutting edge 37, and is inclined and lying at a higher position as going from the upper surface 32 to the ridge portion 411, and then reaches the ridge portion 411; and a second inclined portion 413 which is formed on the opposite side of the first inclined portion 412 with the ridge portion 411 interposed therebetween, and gradually approaches the upper surface 32. The ridge portion 411 corresponds to an intersection region of the first inclined portion 412 and the second inclined portion 413.

The first inclined portion 412 performs a role in guiding the chips generated from the side cutting edge 37 to a chip discharge direction. Specifically, the chips generated by the side cutting edge 37 are stably discharged in the direction of arrow G shown in FIG. 7(b), along the first inclined portion 412 while being curled in a helical shape by the first inclined portion 412. Therefore, particularly in machining a narrow-width groove in which the chips are likely to remain in a machined groove, the chips are less likely to remain the machined groove, and are discharged satisfactorily. Additionally, "trapping" that the chips are trapped between a machined surface and the cutting edge can be reduced, thereby reducing damage to the machine surface. Furthermore, the first inclined portion 412 has an inclination that rises from the upper surface 32, in a range from near the side cutting edge 37 to the ridge portion 411, thereby contributing to a reduction in the cutting resistance of the side cutting edge 37.

The first raised part 41 is inclined and lying at a lower position toward a rear part thereof (one end portion thereof) that is remote from the front cutting edge 36 in a side view. That is, the rear part of the first raised part 41 has a smaller distance from the lower surface 10 as it separates from the front cutting edge 36 in the side view. Accordingly, as shown in FIGS. 8(a) to 8(c), a front part of the ridge portion 411 is located at a higher position as it separates from the front cutting edge 36, and a rear part thereof is located at a lower position as it separates from the front cutting edge 36.

For example, a portion lying at a higher position as it separates from the front cutting edge 36 has a relationship of Wa<Wb, where Wa and Wb are respectively a distance between the ridge portion 411 and a reference line L10. Here, the reference line L10 is a line that passes through the side cutting edge 37 and is parallel to the lower surface 10. A portion lying at a lower position as it separates from the front cutting edge 36 has a relationship of Wb>Wc, where Wc is a distance between the ridge portion 411 and the reference line L10. In the present embodiment, Wa and Wc are respectively zero. However, no special limitation is imposed on a height of Wa and Wc.

The first raised part 41 having the rear part can suppress an increase in the cutting resistance of the side cutting edge 37 even when a depth of cut of the side cutting edge 37 is increased in the crosscut milling process. In the present specification, the term "depth of cut" denotes a length of a portion of the cutting edge 35 which is brought into contact with the workpiece.

As shown in FIG. 7, the first raised part 41 includes an approach portion 415 that approaches the side cutting edge 37 as it separates from the front cutting edge 36 in a top view. Consequently, during the traversing process, the chips generated by the side cutting edge 37 are satisfactorily discharged along the first raised part 41, and are divided by the appropriate length. Hence, the chips are less likely to remain in the machined groove of the workpiece, thereby reducing damage to the workpiece and the insert due to the chips.

The position of the approach portion 415 may be set according to the depth of cut of the side cutting edge 37. Although no special limitation is imposed thereon, the approach portion is preferably positioned near the rear part of the first raised part 41 from the viewpoint of improving the chip discharge. In the present embodiment, the approach portion 415 includes one of both end portions of the first raised part 41 which is remote from the front cutting edge 36.

In the approach portion 415, a lower end portion of the first inclined portion 412 close to the side cutting edge 37 approaches the side cutting edge 37 as it separates from the front cutting edge 36. That is, as shown in FIG. 7(b), the approach portion 15 is shaped so as to approach the side cutting edge 37 as an intersection region 414 of the first inclined portion 412 and the upper surface 32 separates from the front cutting edge 36 in a top view. In the present embodiment, the front part of the intersection region 414 is shaped so as to separate from the side cutting edge 37 as it separate from the front cutting edge 36, and the rear part thereof is shaped so as to approach the side cutting edge 37 as it separates from the front cutting edge 36.

In the present embodiment, a pair of first raised parts 41 are disposed on the upper surface 32, and are horizontally symmetrically arranged along the pair of side cutting edges 37 and 37 in a top view. That is, the pair of first raised parts 41 and 41 have a region where a width between the two becomes shorter as they separate from the front cutting edge 36. For example, in the grooving process in which a cutting process is carried out by the front cutting edge 36, this region acts to deform the cross section of chips generated from the front cutting edge 36 into a U-shape. This is advantageous in facilitating curling of the chips.

A concave part 42 is formed between the first raised part 41 and the side cutting edge 37. In the present embodiment, as shown in FIG. 7(b), the concave part 42 is formed in the shape of a groove. As shown in FIGS. 8(a) to 8(c), a sidewall surface 421 of the concave part 42 close to the side cutting edge 37 has an inclination that approaches the lower surface 10 as going from the side cutting edge 37 to the first raised part 41. The concave part 42 can contribute to the chip discharge performance improvement because the chips generated by the side cutting edge 37 graze the concave part and are thus previously bent helically.

Other configurations of the insert 31 are similar to those of the insert 1 of the foregoing first embodiment. That is, the upper surface 32 of the insert 31 includes, besides the first raised part 41, the rake surface 3, the rising surface 7, the clamp surface 6, and the second raised part 5.

Figure 9:
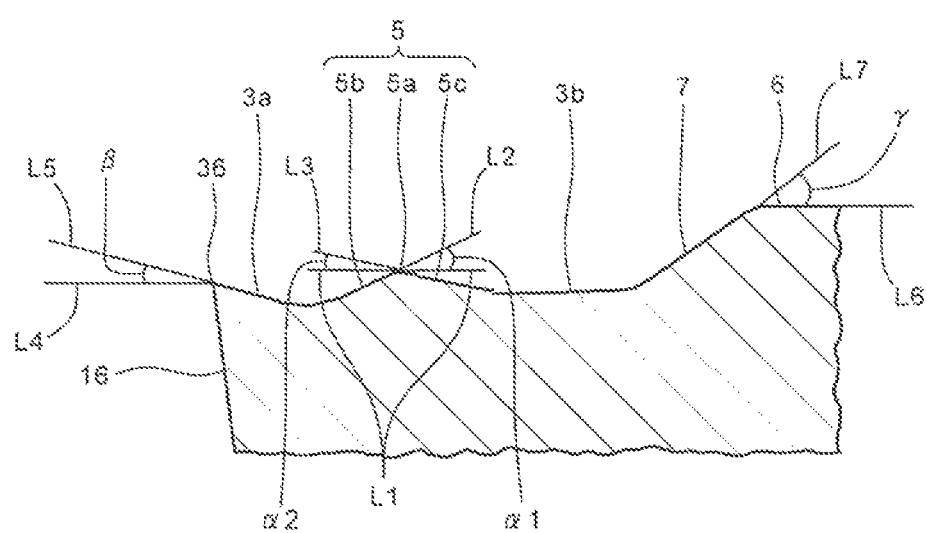
FIG. 9 is a diagram showing an enlarged broken section taken along the line F-F in FIG. 7(b)

As shown in FIG. 9, inclination angles α1 and α2 have a relationship of α1>α2. The rake surface 3a is inclined to approach the lower surface 10 at a predetermined rake angle β as going from the front cutting edge 36 to the second raised part 5. The rising surface 7 is inclined so as to separate from the lower surface 10 at a predetermined rising angle γ as going from the rake surface 3b to the clamp surface 6.

Figure 10:
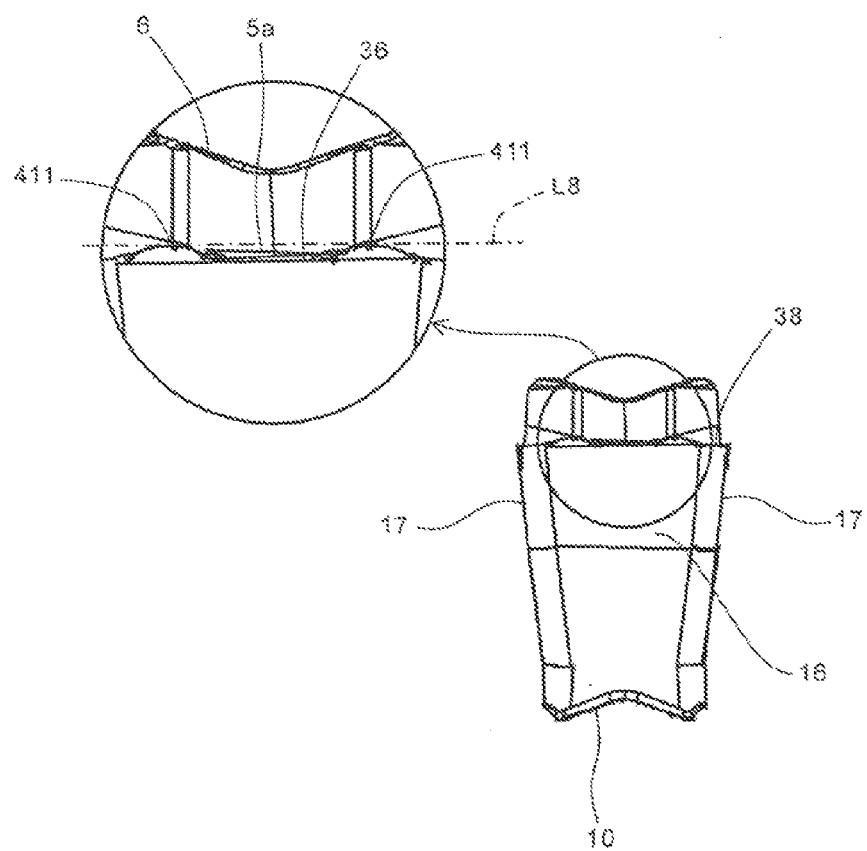
FIG. 10 is an enlarged front view showing the cutting insert according to the second embodiment of the present invention.

As shown in FIG. 10, a ridge portion 5a of the second raised part 5 is located below a virtual straight line L8 connecting ridge portions 411 and 411 of the pair of raised parts 41 and 41 in a front view (side view). Both of the ridges portions 411 and 5a are located at a higher position than the front cutting edge 36, and are located at a lower position than the clamp surface 6.

The foregoing inserts 1 and 31 are applicable to both internal grooving process (internal turning) and external grooving process (external turning).

<Cutting Tool>

Next, a cutting tool according to one embodiment of the present invention is described in detail with reference to FIG. 11.

Figure 11:
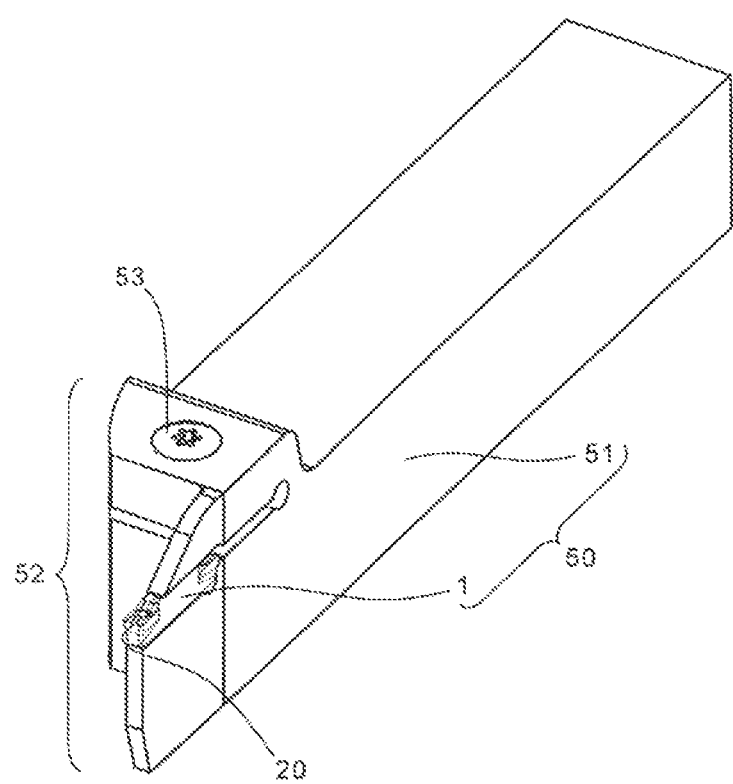
FIG. 11 is a perspective view showing a cutting tool according to an embodiment of the present invention.

As shown in FIG. 11, the cutting tool 50 according to the present embodiment includes the insert 1 and a substantially rectangular column-shaped holder 51 configured to attach the insert 1 to the front end thereof. The insert 1 is attached to the holder 51 so that the cutting edge 20 (front cutting edge 21) thereof protrudes from the front end of the holder 51.

In the present embodiment, the attachment of the insert 1 to the holder 51 is carried out by a clamp mechanism 52 configured to adjust a clamp disposed at the front end of the holder 51 by a screw 53. More specifically, a constraining force is adjusted by the screw 53 disposed at the front end of the holder 51, and the insert 1 is constrained by pressing it from above, without limitation thereto. Examples other than the clamp mechanism 52 include a method in which a hole is provided in the insert 1, and the insert 1 is constrained from an inner wall of the hole of the insert 1 by leverage of a substantially L-shaped lever; and a Method in which the insert 1 is constrained by using a pin with eccentric shaft and head, and by utilizing a hole provided in the insert.

A similar effect is attainable by using the insert 31 instead of the insert 1 as an insert attached to the holder 51.

<Method of Manufacturing Machined Product>

First Embodiment

Figure 12:
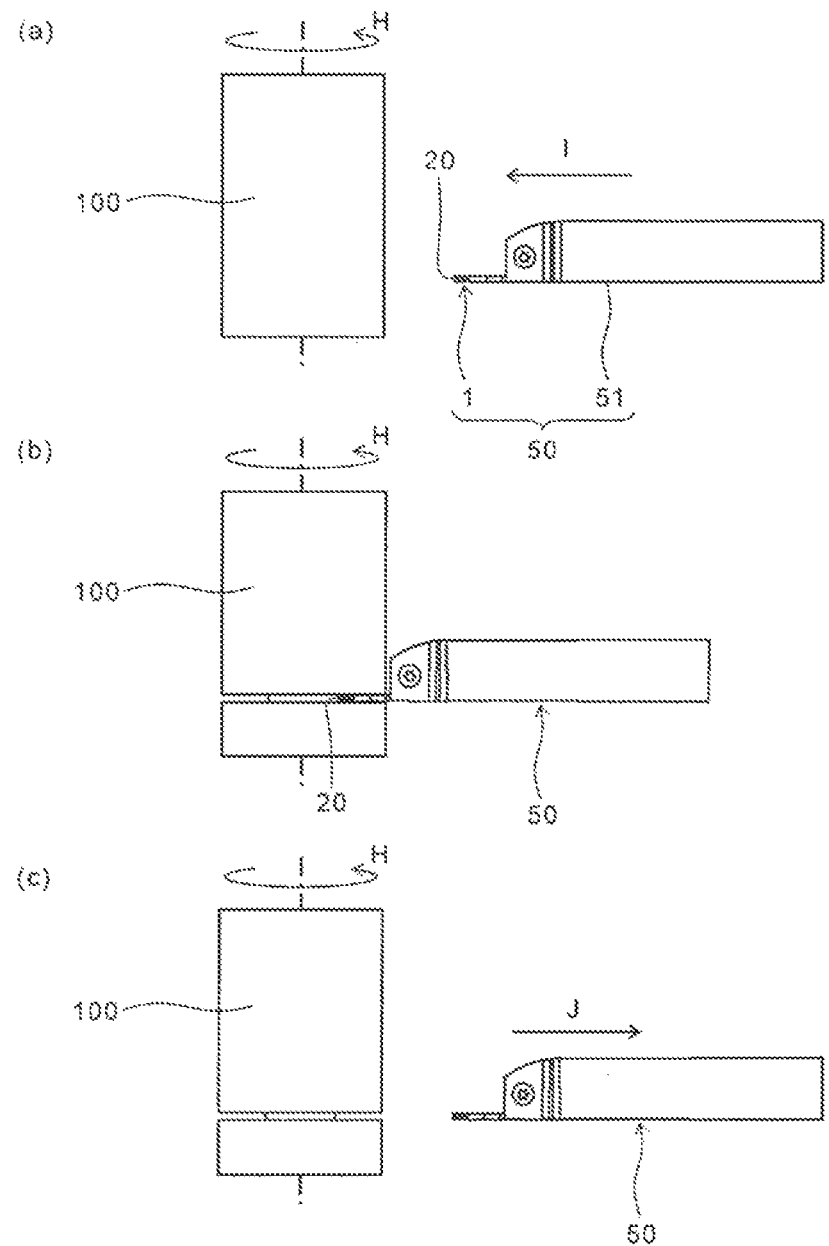
FIGS. 12(a) to 12(c) are schematic explanatory drawings showing a method of manufacturing a machined product according to a first embodiment of the present invention.

A method of manufacturing a machined product according to a first embodiment of the present invention is described in detail below with reference to FIG. 12, by taking the case of performing the outer diameter grooving process by attaching the insert 1.

The method of manufacturing the machined product according to the present embodiment by using a cutting tool 50 includes the following steps (i) to (iii).

(i) rotating a workpiece 100 in a direction of arrow H, as shown in FIG. 12(a);

(ii) bringing the cutting edge 20 of the cutting tool 50 into contact with the rotating workpiece 100 as shown in FIG. 12(b) by moving the cutting tool 50 in a direction of arrow I, as shown in FIG. 12(a), thereby cutting the workpiece 100 (the outer diameter grooving); and (iii) separating the cutting tool 50 from the workpiece 100 by moving the cutting tool 50 in a direction of arrow J, as shown in FIG. 12(c).

A desired machined product is obtainable by cutting the workpiece 100 in the foregoing manner.

In the present embodiment, the workpiece 100 is cut with the cutting tool 50 having excellent chip discharge performance and machined surface accuracy. Therefore, particularly in the step (ii), high cutting performance machining is attainable, thus improving machining efficiency. Even when the workpiece 100 is a material having rich ductility, excellent chip discharge performance can be exhibited, thereby allowing for stable cutting process over a long term. Examples of the workpiece 100 having rich ductility include austenitic stainless steels, such as SUS304; and chromium molybdenum steels, such as SCM415.

In the step (i), the workpiece 100 and the cutting tool 50 may be close to each other. For example, the workpiece 100 may be brought near the cutting tool 50. Similarly, in the step (iii), the workpiece 100 and the cutting tool 50 may be far away from each other. For example, the workpiece 100 may be moved away from the cutting tool 50. When the cutting process is continued, it is required to repeat the step of bringing the cutting edge 20 of the cutting tool 50 into contact with different portions of the workpiece 100 while holding the rotation of the workpiece 100. As stated earlier, the insert 1 is the two-corner type insert. Hence, when the cutting edge 20 in use is worn, an unused cutting edge 20 may be used.

A similar effect is attainable by using the insert 31 instead of the insert 1 as an insert attached to the holder 51.

Second Embodiment

Figure 13:
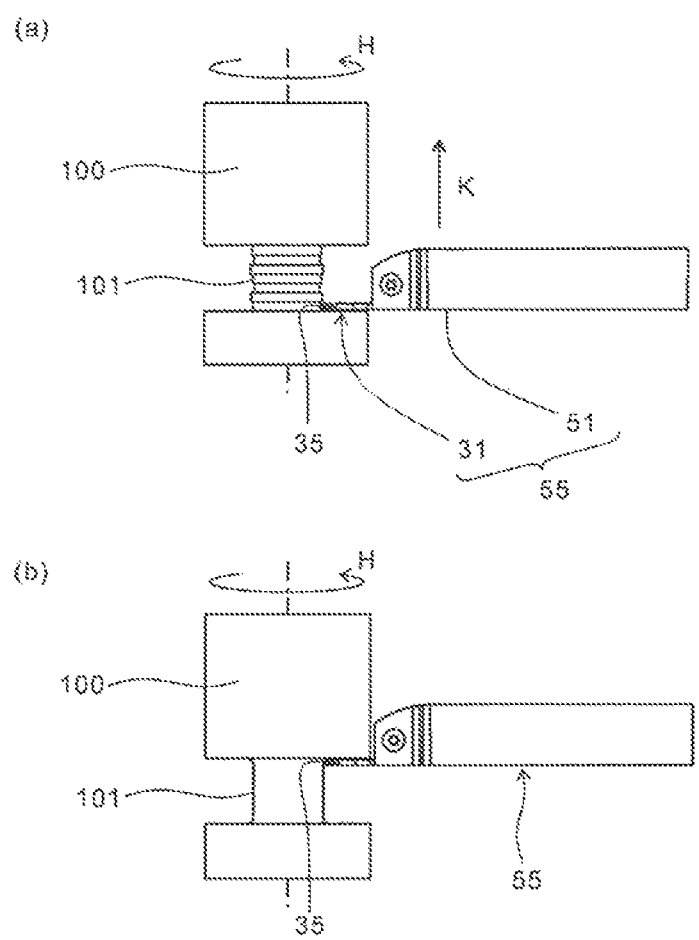
FIGS. 13(a) and 13(b) are schematic explanatory drawings showing a method of manufacturing a machined product according to a second embodiment of the present invention.

Next, a method of manufacturing a machined product according to a second embodiment of the present invention is described in detail below with reference to FIG. 13, by taking the case of performing the outer diameter grooving process by attaching the insert 31.

The insert 31 of the present embodiment permits a smooth crosscut milling process for enlarging a groove width, besides the grooving process for forming a groove.

Firstly, as the traversing process for enlarging the width of the groove, usually, the steps of the grooving process as shown in FIGS. 12(a) to 12(c) are required to be repetitively performed in a lateral direction. As a result, somewhat irregularity may be formed on a bottom surface 101 of the enlarged groove, as shown in FIG. 13(a).

Subsequently, by moving a cutting tool 55 in a direction of arrow K as shown in FIG. 13(a), the bottom surface 101 of the groove can be flattened as shown in FIG. 13(b).

A desired machined product is obtainable by cutting the workpiece 100 in the foregoing manner (crosscut milling process).

With the cutting tool 55 having the insert 31 attached to the holder 51, because the first raised part 41 of the insert 31 includes the approach portion 415, the bottom surface 101 of the groove can be flattened while smoothly discharging the chips, by moving the cutting tool 55 in a direction of arrow K.

As an insert attached to the holder 51, the insert 1 may be used instead of the insert 31. That is, either the insert 1 or the insert 31 may be used in the cutting process in combination of the method of manufacturing a machined product according to the first embodiment and the method of manufacturing a machined product according to the second embodiment, as described above.

While the several embodiments according to the present invention have been described and illustrated above, it is to be understood that the present invention is not limited to the foregoing embodiments, and various improvements and changes can be made within the scope of the appended claims.

Although the inserts 1 and 31 in the foregoing first and second embodiments are configured to use the two corners, the inserts 1 and 31 may be configured to use one corner by applying the configuration of the foregoing embodiments only to one end of each of the inserts 1 and 31.

In the insert 1 according to the first embodiment, the description has been given of the case where both W1 and W2 decrease as going from the cutting edge 20 to the second raised part 5, and are increased from the second raised part 5 to the rising surface 7. That is, in the first embodiment, the description has been given of the case where both W1 and W2 gradually change toward the predetermined direction. For example, W1 and W2 may be configured so that W1 and W2 do not change gradually, and both are smaller a side of the second raised part 5 than a side of the cutting edge 20, and both are larger a side of the rising surface 7 than a side of the second raised part 5.

The invention claimed is:

1. A cutting insert, comprising:
   an upper surface;
   a side surface; and
   a cutting edge located at an intersection region of the upper surface and the side surface,
   wherein
   the upper surface comprises
      a rake surface continuous with the cutting edge, and
      a rising surface inclined and lying at a higher position as going inward from the rake surface, and
   the rake surface comprises
      a pair of first raised parts respectively extending inward from near both ends of the cutting edge in a top view, and
      a second raised part extending from one of the pair of first raised parts to the other.

2. The cutting insert according to claim 1, wherein a ridge portion of the second raised part is parallel to the cutting edge in a top view.

3. The cutting insert according to claim 1, wherein the second raised part comprises
   a first inclined surface inclined at an inclination angle α1 and lying at a higher position as going from the cutting edge to the ridge portion of the second raised part, and
   a second inclined surface inclined at an inclination angle α2 and lying at a lower position as going from the ridge portion of the second raised part to the rising surface.

4. The cutting insert according to claim 3, wherein the inclination angle α1 of the first inclined surface is larger than the inclination angle α2 of the second inclined surface.

5. The cutting insert according to claim 4, wherein a rising angle γ of the rising surface is larger than the inclination angle α1 of the first inclined surface.

6. The cutting insert according to claim 1, wherein the ridge portion of the second raised part is located below a virtual straight line connecting respective ridge portions of the pair of first raised parts in a side view.

7. The cutting insert according to claim 1,
   wherein both W1 and W2 in each of the pair of first raised parts are smaller at a side of the second raised part than a side of the cutting edge, where
      W1 is a distance between the ridge portion of one of the first raised parts and the other ridge portion, and
      W2 is a distance between an intersection region of the one first raised part and a bottom part of the rake surface, and an intersection region of the other first raised part and the bottom part of the rake surface.

8. The cutting insert according to claim 7, wherein both the W1 and the W2 decrease as going from the cutting edge to the second raised part.

9. The cutting insert according to claim 7, wherein both the W1 and W2 are larger a side of the rising surface than the side of the second raised part.

10. The cutting insert according to claim 7, wherein both the W1 and the W2 increase as going from the second raised part to the rising surface.

11. The cutting insert according to claim 1, wherein
   the cutting edge comprises a first cutting edge and a second cutting edge intersecting each other, and
   at least one of the pair of first raised parts. comprises an approach portion, wherein the approach portion extends along the second cutting edge and approaches the second cutting edge as separating from the first cutting edge.

12. The cutting insert according to claim 11, wherein the approach portion comprises an end portion of the at least one of the plurality of the first raised parts, the end portion being further away from the first cutting edge.

13. The cutting insert according to claim 11, wherein the at least one first raised part comprises an inclined portion inclined and lying at a higher position as going from the second cutting edge to the ridge portion of the at least one of the plurality of the first raised parts.

14. The cutting insert according to claim 13, wherein the approach portion further comprises an end portion of the inclined portion, the end portion being further away from the first cutting edge.

15. The cutting insert according to claim 13, wherein the approach portion further comprises a lower end of the inclined portion, the lower end being closer to the second cutting edge.

16. The cutting insert according to claim 11, wherein the approach portion includes the ridge portion of the at least one of the plurality of the first raised parts.

17. The cutting insert according to claim 11, wherein the at least one of the plurality of the first raised parts is inclined and lying at a lower position as going to the end portion further away from the first cutting edge in a side view.

18. The cutting insert according to claim 11, wherein a pair of the second cutting edges are respectively disposed on both sides of the first cutting edge.

19. The cutting insert according to claim 18, wherein the pair of first raised parts are disposed symmetrical to each other along the pair of second cutting edges in a top view.

20. The cutting insert according to claim 1, wherein the upper surface further comprises a clamp surface positioned inward compared to the rising surface.

21. A cutting tool, comprising:
- a cutting insert according to claim 1; and
- a holder configured to attach the cutting insert to a front end thereof.

22. A method of manufacturing a machined product, comprising:
- rotating a workpiece;
- bringing the workpiece being rotated and the cutting edge of the cutting tool according to claim 21 into contact with each other; and
- separating the workpiece and the cutting tool from each other.

\* \* \* \* \*